United States Patent

[11] 3,591,776

| [72] | Inventor | Robert A. Sylvester<br>Corapolis, Pa. |
|---|---|---|
| [21] | Appl. No. | 881,650 |
| [22] | Filed | Dec. 3, 1969 |
| [45] | Patented | July 6, 1971 |
| [73] | Assignee | Jones & Laughlin Steel Corporation<br>Pittsburgh, Pa. |

[54] AUTOMATIC CROP SHEAR CONTROL SYSTEM
3 Claims, 1 Drawing Fig.

[52] U.S. Cl. ................................................ 235/92 DN,
33/141 R, 235/92 R, 235/92 CC, 235/92 PD,
235/151.32
[51] Int. Cl. ...................................................... G06m 7/00
[50] Field of Search ........................................ 235/92 DN,
92 PD, 92 CC, 103.5, 151.32; 83/76, 356; 33/132,
133, 136, 141

[56] References Cited
UNITED STATES PATENTS
| 3,157,952 | 11/1964 | Laycak | 235/92 DN |
|---|---|---|---|
| 3,050,857 | 8/1962 | Pierce | 235/92 DN |
| 3,199,391 | 8/1965 | Haner | 235/151.32 |

*Primary Examiner*—Maynard R. Wilbur
*Assistant Examiner*—Robert F. Gnuse
*Attorneys*—T. A. Zalenski and G. R. Hariis

ABSTRACT: A system employing digital techniques for automatically controlling a shearing device to crop a desired length from the trailing end of an elongated article while the article is conveyed along a longitudinal path. Two sensors determine the ends of the article and control the counting of tachometer pulses. Provision is made to compensate for delay time of the shear.

PATENTED JUL 6 1971
3,591,776
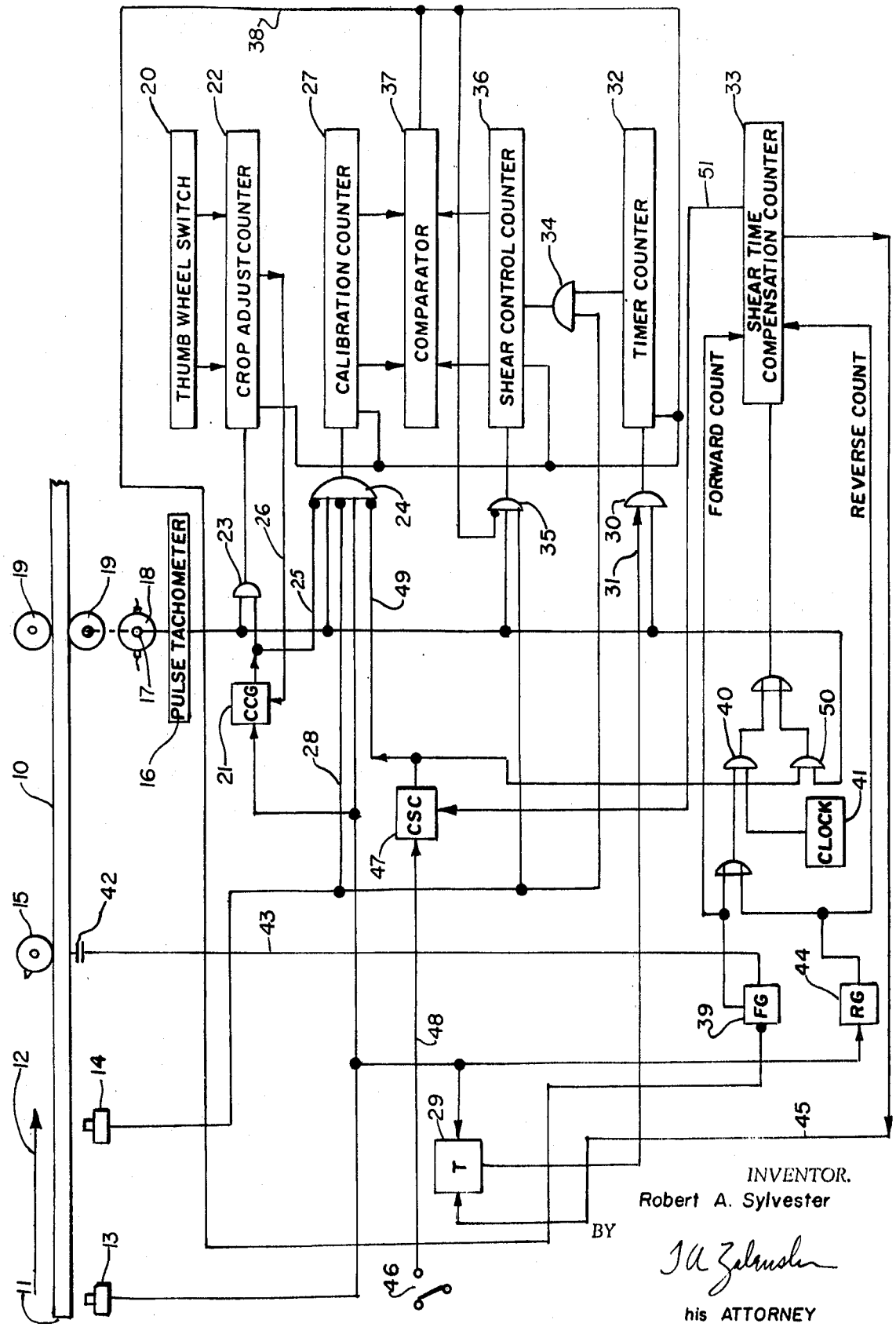
INVENTOR.
Robert A. Sylvester
BY
his ATTORNEY

AUTOMATIC CROP SHEAR CONTROL SYSTEM

This invention relates generally to an automatic shear-control system, and, more particularly, to such a system for automatically cropping the tail end of a steel breakdown bar prior to its reduction in the finishing stands of a hot strip rolling mill.

To facilitate the handling of steel strip at the coiler of a hot strip mill, the tail end of the breakdown bar, from which the strip is rolled, is cropped prior to the reduction of the bar in the mill finishing stands. The cropping operation is typically performed by a suitable shearing device which shears the bar on the fly, i.e., as the bar is conveyed along its longitudinal path. Ideally, to minimize yield losses, the bar should be cropped just enough to square off its end. This objective is difficult to attain, however, when shear activation is done manually, because between the time the shear is activated and the time it first engages the bar the bar continues to travel and, consequently, the shear operator must allow for the speed of the bar and the delay time of the shear in determining when to activate the shear. As a result, what happens in actual practice, is that the operator, anxious not to activate the shear so late that the shear misses the bar, activates the shear prematurely thereby increasing yield losses.

The system of the present invention provides for automatic and accurate tail cropping. The system consists basically of two photocells, a pulse tachometer and counting and controlling circuitry. The photocells are positioned along the path of travel of the breakdown bar upstream of the shear and are spaced apart a distance equal to the distance between the shear and the photocell closest to it. The pulse tachometer is attached to the shaft of the descaler pinch roll drive motor of the rolling mill. When the trailing end of the breakdown bar passes the first photocell, tachometer pulses are enabled into a crop adjust counter which counts up to a pulse level representative of the desired crop length whereupon the crop adjust counter is disabled and tachometer pulses enabled into a calibration counter. The latter counter counts tachometer pulses until the tail end of the bar passes the second photocell, at which time it is gated off. The number of pulses accumulated in the calibration counter represents the linear distance between the photocells less the desired crop length.

At the same time the crop adjust counter is enabled a timer is activated which in turn enables tachometer pulses into a timer counter for a predetermined period of time. This time is adjustable and is calibrated to equal the travel time of the crop shear. For purposes of this disclosure the shear travel time or shearing cycle is defined as beginning with the activation of the shear and ending with the engagement of the shear with the article being cropped. The total number of pulses accumulated in the timer counter during this predetermined time is directly related to the distance the bar moves during a period of time equal to the shearing cycle time.

To automatically compensate for shear travel time variations, an auxiliary counter which detects the variation in shear travel time for each cropping operation and adjusts the timer activation period accordingly is provided. As a result, the point at which the shear command is generated is adjusted to offset the variation in shear travel time.

When the trailing end of the breakdown bar passes the second photocell the pulse level in the timer counter is transferred into a shear control counter and tachometer pulses are enabled into this latter counter which begins to count up from the transferred pulse level. When the shear control counter reaches the number stored in the calibration counter, a shear command is issued.

The system also includes circuitry for automatically adjusting the length of crop, should the breakdown bar be in the accelerating mode when the computation sequence begins. The crop adjustment is effected by decreasing the number of pulses delivered to the calibration counter by an amount which represents a predetermined linear distance. The result is to generate the shear command earlier than would otherwise be the case.

An object of the invention is to provide a system employing digital techniques for controlling the operation of a shearing device to accurately crop desired lengths from the trailing end of an elongated article conveyed along a longitudinal path. Another object of the invention is to provide such a system for cropping the tail end of a steel breakdown bar prior to its reduction in the finishing stands of a hot strip rolling mill. A further object of the invention is to provide such a system wherein variations in shear travel time are automatically compensated for. Yet another object of the invention is to provide such a system wherein the length of crop is automatically adjusted should the article be in an accelerating mode.

These and other objects and advantages of the present invention will become more apparent from the following detailed description thereof with reference to the accompanying drawing wherein the figure is a schematic illustration of a presently preferred embodiment of the invention.

A red hot breakdown bar 10 having a trailing end 11 is conveyed along a longitudinal path in the direction of arrow 12 to a hot strip mill, not shown. Positioned along the path of travel of the bar are first and second indicating stations comprising respectively photocell units 13 and 14 which function in response to the infrared radiation emitted by the breakdown bar. The photocells are spaced apart a distance equal to the distance between photocell 14 and shearing device 15 which acts to crop the tail end 11 of bar 10. Pulse generating means in the form of pulse tachometer 16 is attached to the shaft 17 of motor 18 which drives the descaler pinch rolls 19–19 at the entry end of the hot strip mill. The tachometer generates electrical pulses in response to and at a rate dependent on the rotative speed of the drive shaft and, consequently, at a rate dependent on the rotative speed of the pinch rolls and the speed of travel of the breakdown bar. The pulses can therefore be used to represent linear dimensions along the breakdown bar.

Manual selection of a desired crop length is provided for by a conventional thumbwheel switch 20 which typically can be set to represent a crop length from zero to 12 inches. The system begins its computing sequence when tail end 11 of bar 10 passes first photocell 13 which at that time develops an output to set crop control gate 21. The setting of the crop control gate enables AND gate 23 to pass pulses generated by tachometer 16 to crop adjust counter 22 where they are counted. The setting of crop control gate 21 maintains AND gate 24 disabled through line 25. When the crop adjust counter reaches the number preset in the thumbwheel switch, it issues an output through lead 26 which resets control gate 21 thereby disabling gate 23 and enabling gate 24 through lead 25 to pass pulses generated by the tachometer to calibration counter 27 which then begins its counting period.

Counter 27 terminates its counting period when trailing end 11 passes second photocell 14 which at that time develops an output disabling gate 24 through lead 28. It will be understood that during its counting period, calibration counter 27 counts a number of pulses representative of the distance between the photocells 13 and 14 less the number of pulses representative of the crop length desired.

The output of photocell 13, developed at the time the tail end of bar 10 passes thereby is also applied to timer 29 to set it. Setting of the timer enables AND gate 30 through line 31 to pass tachometer pulses to timer counter 32. The time period during which timer 29 remains set is representative of the shear travel time or a shearing cycle, i.e., the time period between shear activation and engagement of the shear and the trailing end of the breakdown bar, and is controlled by shear time compensation counter 33, the operation of which is more fully described below. Upon resetting of timer 29 by counter 33 gate 30 is disabled. Thus, the pulse count in timer counter 32 upon the resetting of timer 29 is representative of the distance the breakdown bar advances during a shear cycle time period.

The output developed by photocell 14 upon the passing of trailing end 11 thereby is also applied both to AND gate 34 to transfer the count accumulated in timer counter 32 into shear control counter 36 and to AND gate 35 to enable the gate to pass tachometer pulses to the shear control counter. Shear control counter 36 then begins to count tachometer pulses starting with the count transferred from timer counter 32. Comparator 37 compares the counts in the calibration counter 27 and shear control counter 36 and when the count in the latter reaches the count stored in the former issues an output via lead 38 to activate shear 15. This output also resets the counters and sets forward count gate 39.

The setting of gate 39 places shear time compensation counter 33 in a forward counting mode and enables AND gate 40 to pass pulses from digital clock 41 to the shear time compensation counter. Completion of the shearing cycle closes contacts 42 thereby resetting gate 39 through lead 43 so as to disable gate 40. It can thus be understood that the clock pulse count in counter 33 at this time is representative of the shear travel time or shearing cycle. The clock pulse count in counter 33 is stored there for application during the next cropping operation. During the next cropping operation, the output developed by photocell 13 when the trailing end of the breakdown bar passes thereby is applied to reverse count gate 44 to set it. Setting of gate 44 places shear time compensation counter 33 in a reverse counting mode and enables AND gate 40 to pass pulses from clock 41 to the shear time compensation counter. The counter then counts down from the count stored in it during the previous cropping operation, as described, and when the counter reaches zero issues an output which resets timer 29 through lead 45. Resetting of timer 29 disables gate 30, as described above. In this manner the system continuously updates shear travel time computations to compensate for drifts in the actual shear travel time.

The accuracy of the system so far described is dependent on the breakdown bar maintaining substantially the same average speeds during the time period timer 29 is set and during the shearing cycle once the trailing end of the bar enters the computing zone. Otherwise, the pulse level set in shear control counter 36 by timer counter 32 will not be representative of the distance the bar travels between shear activation and shear engagement with the bar. Typically, for a hot strip mill rolling breakdown bars into strip, speed variations after the tail ends of the bars enter the computing zone occur only for about 2 percent of the bars. Where the breakdown bar is short and reduction through the mill is not great, the tail end of the bar is in the computing zone when the head end of the strip reaches the coiler. During normal production practice the strip speed is accelerated for a period of time after the head end reaches the coiler and, as a result, when the bar is short it will be in an accelerating mode as its trailing end passes through the computing zone. The system of the invention includes means for adjusting for this contingency.

Adjustment is effected by decreasing the pulse accumulation in calibration counter 27 during its counting period by an amount which is representative of a linear distance which compensates for speed acceleration. For example, in a hot strip mill with which I am familiar, I have found that by decreasing the accumulation in counter 27 during its counting period by an amount representative of a length of 9 inches speed acceleration is adequately compensated for.

Referring to the figure of the drawing, when the bar is in the accelerating mode as its trailing end passes through the computing zone, coiler line acceleration switch 46 is closed, setting coil speed-up compensation gate 47 through lead 48. Setting of gate 47 disables AND gate 24 through lead 49 and enables AND gate 50 to pass tachometer pulses to counter 33. Counter 33 is programmed so that when it has counted a number of tachometer pulses which is representative of a linear distance which compensates for speed acceleration, e.g., 9 inches, it issues an output to lead 51 which resets gate 47, thereby enabling gate 24 to pass tachometer pulses and disabling gate 50. Therefore, the pulse count accumulated in calibration counter 27 during its counting period will be representative of the distance between photocells 13 and 14 less the pulse count representative of the desired crop length and less the pulse count representative of a linear distance which compensates for speed acceleration. The net effect is that the shear command will be generated earlier by a pulse count representative of a linear distance which compensates for speed acceleration.

I claim:

1. Apparatus for automatically activating a shearing device to crop a desired length from the trailing end of an elongated article while the article is conveyed along a longitudinal path, including first and second indicating stations positioned along said path and spaced apart a distance equal to the distance between the second station and the shearing device, pulse generating means for generating pulses at a rate dependent on the speed of travel of the elongated article along its longitudinal path, a crop adjust counter for counting pulses generated by said pulse generating means beginning with the passage of the trailing end of the elongated article past the first indicating station and terminating with a pulse count representative of the desired crop length, a calibration counter for counting pulses generated by said pulse generating means during a counting period beginning with the termination of counting by said crop adjust counter and terminating with the passage of the trailing end of the elongated article past the second indicating station, a shear control counter for counting pulses generated by said pulse generating means beginning with the passage of the trailing end of the elongated article past the second indicating station and starting at a pulse level representative of the distance the article travels while the shearing device completes a shearing cycle, and comparator means for issuing a shear command to the shearing device upon the shear control counter reaching the pulse count in the calibration counter.

2. The apparatus of claim 1 including clock means for generating pulses, a shear time compensation counter for counting the number of pulses generated by the clock means while the shearing device completes a shearing cycle during a first cropping operation and for counting down from that number of pulses during the next cropping operation in response to pulses from the clock means, a timer counter for counting pulses from said pulse generating means during the time period the shear time compensation counter counts down to zero from said number of pulses, and means for transferring the count in the timer counter to the shear control counter before the shear control counter begins its counting sequence.

3. The apparatus of claim 2 including speedup compensation means for first disabling the calibration counter during its counting period while the elongated article travels along its path a preselected distance and for then reenabling the calibration counter, thereby compensating for article speed acceleration.